United States Patent
Yang et al.

(10) Patent No.: US 9,404,793 B2
(45) Date of Patent: Aug. 2, 2016

(54) METHOD AND SYSTEM FOR ADJUSTING BRIGHTNESS

(75) Inventors: Chu-Sing Yang, Tainan (TW); Jer-Nan Juang, Tainan (TW); Chao-Yang Lee, Tainan (TW)

(73) Assignee: National Cheng KUNG UNIVERSITY, Tainan (TW)

( * ) Notice: Subject to any disclaimer, the term of this patent is extended or adjusted under 35 U.S.C. 154(b) by 713 days.

(21) Appl. No.: 13/464,471

(22) Filed: May 4, 2012

(65) Prior Publication Data

US 2012/0280626 A1    Nov. 8, 2012

(30) Foreign Application Priority Data

May 4, 2011    (TW) .............................. 100115665 A

(51) Int. Cl.
| | |
|---|---|
| H05B 37/02 | (2006.01) |
| H05B 39/04 | (2006.01) |
| H05B 41/36 | (2006.01) |
| G01J 1/18 | (2006.01) |
| H05B 33/08 | (2006.01) |
| H05B 35/00 | (2006.01) |
| G01J 1/42 | (2006.01) |

(52) U.S. Cl.
CPC ................. *G01J 1/18* (2013.01); *G01J 1/4204* (2013.01); *H05B 33/0854* (2013.01); *H05B 35/00* (2013.01); *H05B 37/0218* (2013.01); *H05B 37/0227* (2013.01); *H05B 37/0245* (2013.01); *Y02B 20/46* (2013.01)

(58) Field of Classification Search
USPC .................................................. 315/149–159
See application file for complete search history.

(56) References Cited

U.S. PATENT DOCUMENTS

| | | | | |
|---|---|---|---|---|
| 8,455,830 | B2* | 6/2013 | Westaway ...................... | 250/348 |
| 2003/0052789 | A1* | 3/2003 | Colmenarez ....... | G06K 9/00771 340/575 |
| 2004/0105264 | A1* | 6/2004 | Spero ............................ | 362/276 |
| 2005/0143617 | A1* | 6/2005 | Auphan .................... | A61B 5/08 600/26 |
| 2010/0110111 | A1* | 5/2010 | Kim et al. ...................... | 345/690 |
| 2011/0089842 | A1* | 4/2011 | Aldrich .............. | H05B 37/0218 315/152 |
| 2011/0273114 | A1* | 11/2011 | Ogg et al. ...................... | 315/312 |
| 2012/0019168 | A1* | 1/2012 | Noda et al. ..................... | 315/307 |
| 2012/0206050 | A1* | 8/2012 | Spero ............................ | 315/152 |
| 2012/0280626 | A1* | 11/2012 | Yang et al. ..................... | 315/158 |
| 2013/0175926 | A1* | 7/2013 | Katsuno .......................... | 315/82 |

FOREIGN PATENT DOCUMENTS

| | | |
|---|---|---|
| CN | 101137260 A | 3/2008 |
| CN | 101247686 A | 8/2008 |
| JP | 2009075157 | 7/2009 |
| TW | 386223 B | 4/2000 |
| TW | 200917899 A | 4/2009 |
| TW | 201111930 A | 4/2011 |

\* cited by examiner

*Primary Examiner* — Brandon S Cole
(74) *Attorney, Agent, or Firm* — Haverstock & Owens LLP

(57) ABSTRACT

The present disclosure is directed to the method and system which use an image caught by a photographic device for calculating a brightness of a space and acquiring a state of an object, and adjust the illuminant device and/or the shading device for the space to make the brightness of the space achieve the proper level.

19 Claims, 4 Drawing Sheets

METHOD AND SYSTEM FOR ADJUSTING BRIGHTNESS

CROSS-REFERENCE TO RELATED APPLICATION AND CLAIM OF PRIORITY

The application claims the benefit of Taiwan Patent Application No. 100115665, filed on May 4, 2011, in the Taiwan Intellectual Property Office, the disclosures of which are incorporated herein in their entirety by reference.

TECHNICAL FIELD

The present disclosure is directed to a controlling method for the brightness. Specifically, the present disclosure is a method for adjusting the brightness of a monitored space or place based on the state of a targeted/observed object.

BACKGROUND

Since the global economics rapidly develop in recent years, the consumptions of sources of the earth are increased and the global climate is rapidly changed accordingly. Therefore, it is more and more important to lower man-made energy consumptions and carbon emissions and the effects resulted from the greenhouse effect. The proportion of the total power consumption generated by the illuminant products is always large from the electric light being invented and popularly used. Such usages of electric light not only influence biological cycles of organisms, but also cause lots of power consumptions.

According to the investigation of the American Lighting Association, household lighting accounts for 12-15% of the household utility bill. Besides, the study of Louisiana State University of U.S.A. shows that there is 20% of the total electric power of the America being used for the lighting, and half of the 20% of the total electric power is squandered due to the improper brightness sources and the user's carelessness. From this study, it is known that there are still many defects on the control of the space brightness.

The known technique for controlling the brightness of specific space usually applies additional brightness-sensing module to sense the current brightness of the specific space and then adjusts the current brightness based on the sensing result. However, the known technique cannot adjust the brightness of specific space in respond to various kinds of objects, e.g. a user, and situations. Therefore, the brightness controlled by the known technique may be over or insufficient for the user in the specific space, and the improper brightness is the consumption of power.

Employing experiments and researches full-heartily and persistently, the applicant finally conceived the method for adjusting brightness and system thereof.

SUMMARY

The present method and system use an image caught by photographic device for calculating a brightness of a space or a place and acquiring a state of an object, and adjust the illuminant device and/or the shading device for the space to make the brightness of the space achieve the proper level.

When the present method and system are used indoor space, a shading device for the space is applied to adjust a shading level against an environmental light source outside of the space. Specifically, when the brightness provided from the environmental light source is over for the object in the space, the illuminant device for the space can be turned off and the shading device for the space is applied to provide a certain of shading level against the environmental light source so as to make the brightness of the space achieve the proper level.

On another aspect, the present disclosure provides a method for controlling a brightness of a monitored space having a targeted object therein, comprising the steps of acquiring a brightness information of the monitored space; acquiring an objective (reference) brightness corresponding to a behavioral state of the targeted object; and determining whether the brightness of the monitored space needs to be adjusted based on the brightness information and the objective brightness.

On another aspect, the present disclosure provides a controlling system controlling a brightness of a monitored space having a targeted object therein, comprising a photographic unit catching an image related to the monitored space; an analyzing unit analyzing a brightness information of the monitored space and a behavioral state of the targeted object based on the image; and a controlling unit adjusting the brightness of the monitored space according to the brightness information and the behavioral state.

On another aspect, the present disclosure provides a method for determining a brightness of a monitored space having a target object therein, comprising the steps of acquiring a behavioral state of the target object; and determining the brightness based on the behavioral state.

DETAILED DESCRIPTION

The present disclosure can be fully understood and accomplish by the skilled person according to the following embodiments. However, the practice of the present method is not limited into following embodiments.

Figure 1:
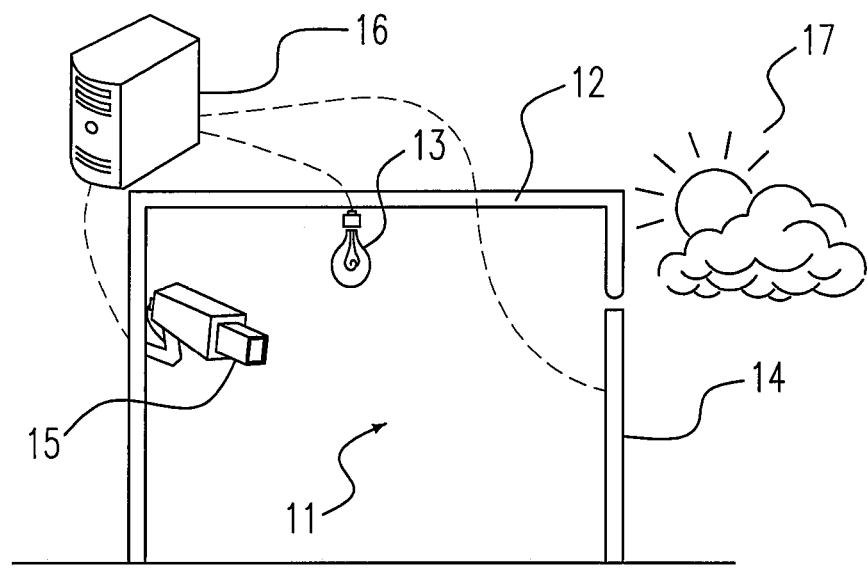
FIG. 1 is a diagram showing the present invention applied to a monitored space.

Please refer to FIG. 1 which is a diagram showing the present invention applied to a monitored space, and the monitored space is an indoor space 11. Indoor space 11 has an external wall 12 therearound. An illuminant device 13 and a shading device 14 are provided for adjusting the brightness of indoor space 11, and a photographic device 15 is provided for catching the image, photo, frame or video of the indoor space 11. A main computer 16 is set at the outside of indoor space 11 and connected to illuminant device 13, shading device 14 and photographic device 15 with wireless network or cable for communicating and remotely controlling them. Outside of indoor space 11 exists an environmental light source 17 providing the outside environmental brightness. Shading device 14 provides a shading level against the environmental brightness for adjusting the brightness of indoor space 11, and the shading level may be adjusted by changing a transmittance of shading device 14 and/or adjusting the orientation and/or shading angle of shading device 14.

In one embodiment, the brightness, except generating by the light source disposed in indoor space 11, illuminating into indoor space 11 is deemed the outside environmental brightness. Therefore, the outside environmental brightness is not only limited into the sunlight but includes the brightness generating by the illuminant device outside of indoor space 11 and illuminating into indoor space 11, and the reflecting brightness reflecting from other brightness and illuminating into indoor space 11.

In one embodiment, main computer 16 may be disposed in indoor space 11 and communicates with photographic device 15 by wireless network and/or cable for receiving the image, photo, frame or video caught by photographic device 15. Those caught image, photo, frame or video can be analyzed for determining the degree of adjustment for the brightness of indoor space 11. Main computer 16 can be used to proceed these analyses, and control and adjust the brightness of illuminant device 13 and/or the shading level of shading device 14 against the environmental brightness.

In one embodiment, indoor space 11 is totally formed by shading device 14, where the brightness in indoor space 11 is provided by the environmental brightness. In such situation, adjustment of the shading level of shading device 14 against the environmental brightness can make the brightness in indoor space 11 arrive at the proper level.

In one embodiment, indoor space 11 is made of opaque external wall where illuminant device 13 in indoor space 11 provides the brightness therefor. In such situation, adjustment of brightness of illuminant device 13 can make the brightness in indoor space 11 arrive at the proper level.

In one embodiment, the present method and system could be applied to an outdoor space without the external wall or shading device nearby. At the outdoor space, the main computer controls the illuminant device and the photographic device. The main computer receives the image from the photographic device via remote access and controls the brightness of the illuminant device. The main computer could be configured with the illuminant device, where the main computer remotely accesses the image from the photographic device and directly controls the brightness of the illuminant device. Furthermore, the photographic device could be configured with the illuminant device, where the main computer controls the brightness of the illuminant device via remote access and control.

In one embodiment, the present method and system could be applied to an outdoor space such as a bus shelter, where the outdoor space has a shading device in its surrounding. Under the sunshine, the shading device could be adjusted by the main computer for providing the passengers at the bus shelter with proper brightness and comfortable waiting environment. Also, the main computer receives the image from the photographic device disposed at the bus shelter and adjusts the illuminant device and the shading device via remote access and control.

Figure 2:
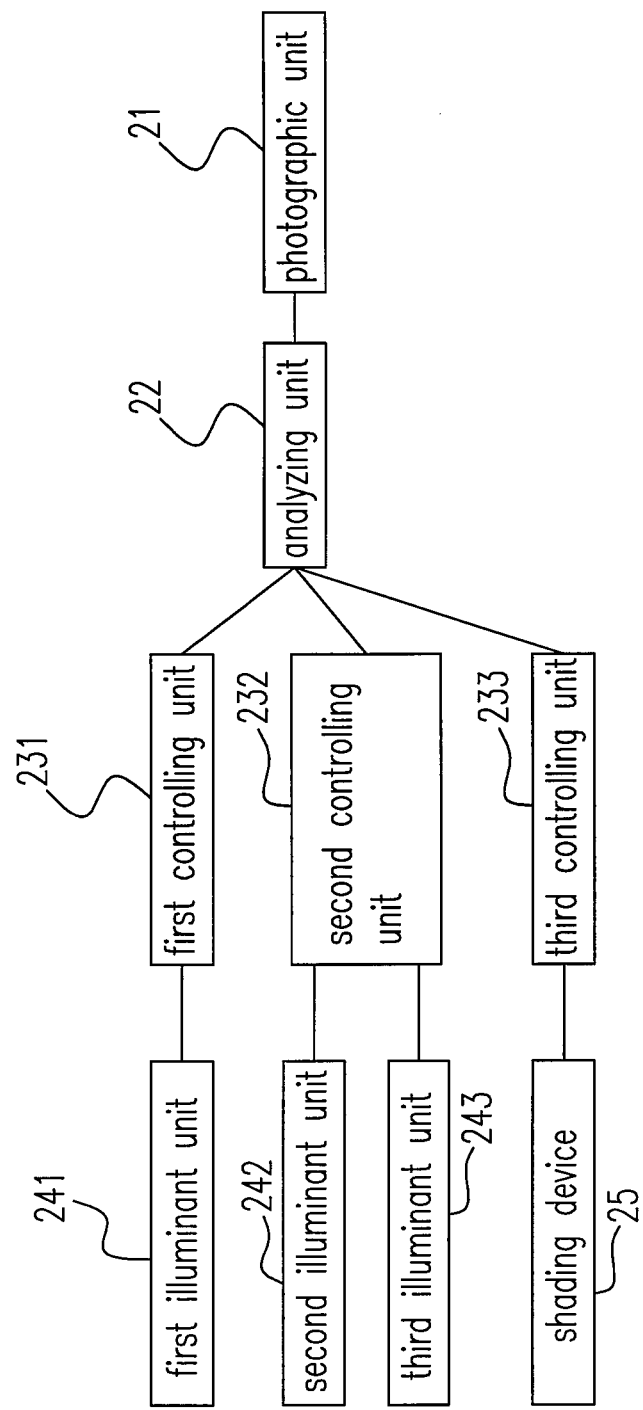
FIG. 2 is a diagram showing the present controlling system used for controlling the brightness of a monitored space.

Please refer to FIG. 2 which is a diagram showing an embodiment of the present controlling system used for controlling the brightness of a monitored space. The controlling system includes a photographic unit 21, an analyzing unit 22, a first, a second and a third controlling units 231, 232 and 233, a first, a second and a third illuminant units 241, 242 and 243 and a shading device 25, wherein photographic unit 21 is coupled to analyzing unit 22, analyzing unit 22 is coupled to first, second and third controlling units 231, 232 and 233, and first, second and third controlling units 231, 232 and 233 are coupled to first illuminant unit 241, second and third illuminant units 242 and 243, and shading device 25 respectively. The monitored space is not limited as the shooting scope of the photographic unit but indicates a specific space at which photographic unit 21 are monitoring. For example, if there is a photographic device disposed in a room, all the space in the room is monitored by the photographic device so that all the space in the room, rather than only the scope shot by the photographic device is seen as the monitored space.

Photographic unit 21 catches an image of the monitored space, where the image may be a photo or a continuous image, e.g. a video. The image caught by photographic unit 21 is sent to analyzing unit 22 via wired or wireless communication for further analysis to acquire the brightness of the monitored space. Analyzing unit 22 analyzes the brightness in the image received from photographic unit 21 to obtain the brightness information of the monitored space. There are many methods for analyzing the brightness information by the image, e.g. YUV color space and YCbCr color space, where "Y" represents the brightness. For example, the "Y" value of YUV color space represents the luminance and indicates the value of brightness. Generally, the received image represents by RGB values, and these values can easily by transformed into YCbCr color space via color space transformation, wherein the "Y" value has a range of 16-235 for representing the brightness. Since the color space transformation between RGB and YCbCr is relatively convenient, YCbCr color space is more popular than other methods in this field.

Analyzing unit 22 is applied to ascertain whether there is an targeted object exiting in the monitored space; and if yes, analyzing unit 22 can further ascertain a position and a behavioral state of the targeted object via the image. If the monitored space is an indoor space, analyzing unit 22 can ascertain the corresponding position of the targeted object via a defined specific object near the targeted object and the behavioral state via a corresponding action of the targeted object against the specific object. If the monitored space is an outdoor space, analyzing unit 22 not only can ascertain the corresponding position and/or the behavioral state of the targeted object as mentioned above, but also can acquire an accurate position of the targeted object via the GPS (Global Positioning System).

Since analyzing unit 22 knows the position of the targeted object in the monitored space, the corresponding action or relation of the targeted object against the specific object can be obtained and used to be the reference for ascertaining the behavioral state of the targeted object. For example, from the image of the monitored space, it is observed there is a user, i.e. the targeted object, lying on the bed defined as the specific object, and then analyzing unit 22 can ascertain that the user is under a resting state via the corresponding relation between the user and the bed. Furthermore, if there is a vehicle, i.e. the targeted object, driving alone a road in the monitored space, analyzing unit 22 can ascertain that the vehicle is under a driving state via the corresponding relation between the vehicle and the road.

First, second and third controlling units 231, 232 and 233 are used to control the brightness of the monitored space according to the analyzed brightness information and the behavioral state. However, the connections among first, second and third controlling units 231, 232 and 233, first, second and third illuminant units 241, 242 and 243 and shading device 25 is changeable, and first, second and third controlling units 231, 232 and 233 can be combined into a whole controlling unit or divided into more controlling unit(s) for satisfying other necessaries.

In one embodiment, the present controlling system can further include a data base. The data base can be configured into at least one of first, second and third controlling units 231, 232 and 233, or independently configured and further be connected to first, second and third controlling units 231, 232 and 233. The data base is able to store the relationship between the behavioral state and a objective (reference) brightness of the targeted object, wherein the objective brightness refers to the expectative or proper brightness for the monitored space while the targeted object is under a specific behavioral state. First, second and third controlling units 231, 232 and 233 can inquire the stored relationships in the data base for acquiring the objective brightness and adjust the brightness of the monitored space based on the acquired objective brightness.

In one embodiment, the data base can be configured into the analyzing unit 22, or independently configured and further be connected to analyzing unit 22. After ascertaining the behavioral state of the targeted object, analyzing unit 2 directly acquires the objective brightness from the data base and provides it to controlling units 231, 232 and/or 233

In FIG. 2, first, second and third controlling units 231, 232 and 233, and first, second and third controlling units 231, 232 and 233 are coupled to first illuminant unit 241, second and third illuminant units 242 and 243, and shading device 25 respectively. Illuminant units provide the brightness independently, and shading device 25 provides the shading level against the environmental brightness for adjusting the brightness of the monitored space, where the shading level may be adjusted by above-mentioned ways. Besides, each of controlling units 231, 232 and 233 can be connected one or more illuminant unit and/or shading devices. For example, when a classroom is in use, one controlling unit controls all of the shading devices of the classroom to shade the classroom from the environmental brightness so that the contents on the screen projected from projector would not be interfered with the environmental brightness. In the meanwhile, the same controlling unit can turn off all of the lamps in the classroom for decreasing the interferences for the projected contents or turn off partial lamps, usually far from the projecting screen in the classroom for remaining sufficient brightness for the students.

Figure 3:
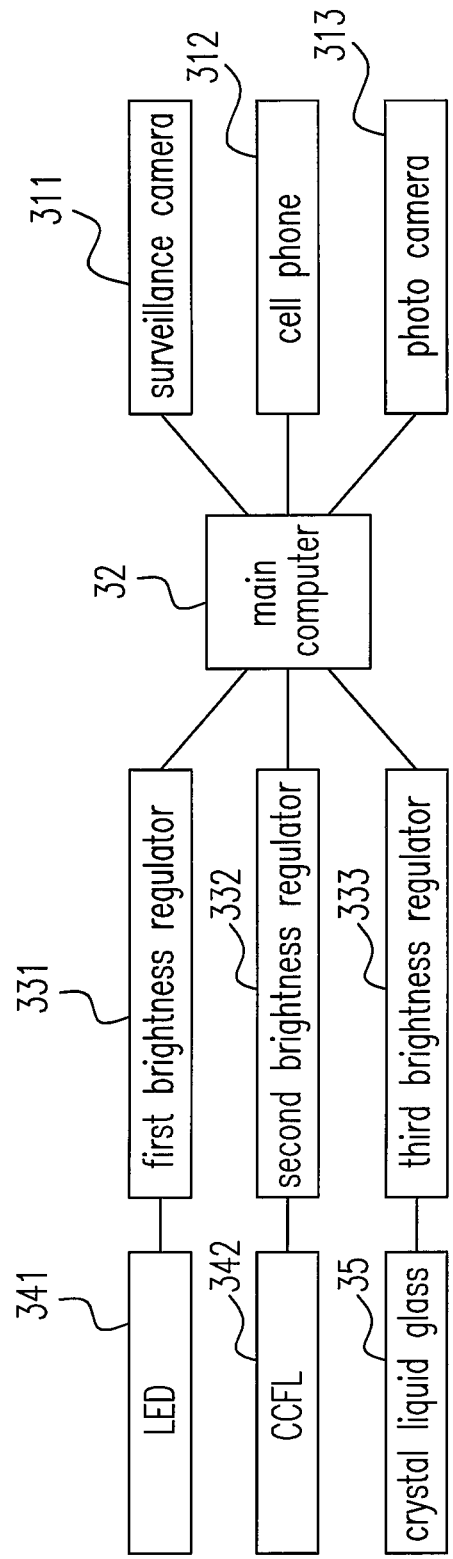
FIG. 3 is a diagram showing the present controlling system used for controlling the brightness of a monitored space.

Please refer to FIG. 3 which is a diagram showing an embodiment of the present controlling system used for controlling the brightness of a monitored space. The controlling system includes a surveillance camera 311, a cell phone 312, a photo camera 313, a main computer 32, a first, a second and a third brightness regulators 331, 332 and 333, a Light-Emitting Diode (LED) 341, a Cold Cathode Fluorescent Lamp (CCFL) 342 and a crystal liquid glass 35, wherein main computer 32 is connected to surveillance camera 311, cell phone 312, photo camera 313 and first, second and third brightness regulators 331, 332 and 333.

Please refer to FIGS. 2 and 3. Photographic unit 21 is the fixed or the portable photographic devices having the photographic function such as a cell phone, a photo camera, a video camera, a webcam, a notebook with the webcam, an event data recorder and a surveillance camera. The combination of surveillance camera 311, cell phone 312 and photo camera 313 as shown in FIG. 3 is a specific embodiment of photographic unit 21.

Main computer 32 is able to include an analyzing unit for analyzing the image(s) caught by surveillance camera 311, cell phone 312 and photo camera 313 and one or more controlling unit to control and adjust the brightness of the monitored space. The controlling system can further include a recognizing unit connected to main computer 32 for determining whether the photographic unit has a controlling authority to the controlling system, and the controlling authority is used for determining whether the image caught by the photographic unit is an analyzing target to be analyzed by the analyzing unit.

In FIG. 3, the illuminant devices of LED 341, CCFL 342 and crystal liquid glass 35 are connected to brightness regulators 331, 332 and 333 respectively. However, one brightness regulator can be connected to and control one or more illuminant devices, if necessary. Brightness regulators 331, 332 and 333 receive the controls of main computer 32 for adjusting the brightness generating by LED 341, CCFL 342 and/or crystal liquid glass 35. Current adjustment and pulse-width modulation (PWM) are commonly applied to adjust the brightness, wherein the current adjustment use the linear regulator to achieve the brightness regulation, and PWM uses digital output from the micro processor to control the analogy circuit and adjusts the pulse width of current to regulates the brightness.

In the above-mentioned embodiments, illuminant devices 241 and 242 can be any of lighting device such as LED 314 and CCFL 342, and the shading device can be any device having the shading function such as a curtain, a screen and a glass. For example, the glass is a ground glass, an opaque glass, a colored glass or an electrically switchable glass of crystal liquid glass and plasma glass.

In one embodiment, main computer 32 is connected to brightness regulators 331, 332 and 333 via wireless network and/or cable, and brightness regulators 331, 332 and 333 can be connected to photographic unit 21 via wireless network and/or cable. Specifically, photographic devices are disposed in the different rooms of the house respectively, and the images caught by the photographic devices are transmitted to the connected brightness regulators. Then, those images are sent to the main computer and analyzed for adjusting the respective brightness in those different rooms.

In the above-mentioned embodiments, the targeted object can be a user of human, an animal, a plant and a vehicle. For the animal and plant, the objective brightness corresponding to various kinds of behaviors of the animal and plant can be stored in the data base, and the present system can therefore be applied to the zoo or botanical garden for providing the animal and plant with the proper brightness in their living environments. For the vehicle, the objective brightness corresponding to different speeds of vehicle can be stored in the data base, and therefore the present system can be applied to the parking lot or specific road, e.g. hill or country roads, for providing the driver with the proper brightness.

Figure 4:
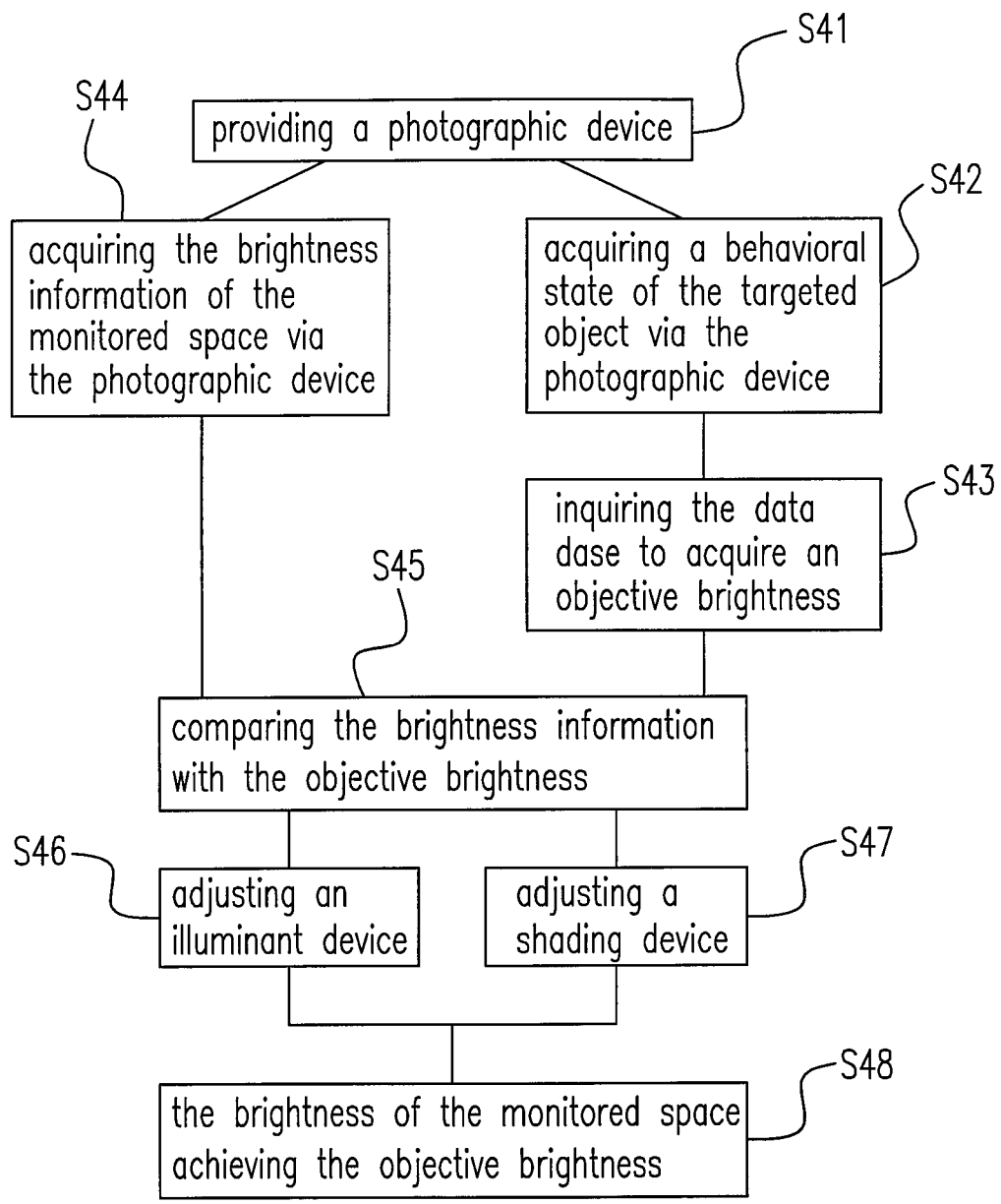
FIG. 4 is a flow chart showing the present controlling method controlling a brightness of a monitored space having a targeted object therein.

Please refer to FIG. 4 which is a flow chart showing the present controlling method controlling a brightness of a monitored space having a targeted object therein. The flow chart of FIG. 4 includes the steps of: (S41) providing a photographic device; (S42) acquiring a behavioral state of the targeted object via the photographic device; (S43) inquiring the data base to acquire an objective brightness corresponding to the behavioral state of the targeted object; (S44) acquiring the brightness information of the monitored space via the photographic device; (S45) comparing the brightness information with the objective brightness; (S46) adjusting an illuminant device; (S47) adjusting a shading device; and (S48) the brightness of the monitored space achieving the objective brightness.

Please refer to FIGS. 2 and 4. In step S41, photographic unit 21 in the monitored space is taken as the photographic device for catching the image of monitored space. In step S42, analyzing unit 22 ascertains the behavioral state of the targeted object in the monitored space based on the image caught by the photographic device. In one embodiment, analyzing unit 22 firstly determines the property of a defined specific object near the targeted object by the image of the monitored space, and then determines a corresponding action of the targeted object against to the defined specific object to further ascertains a behavioral state of the targeted object based on the corresponding action. For example, if analyzing unit 22 determines that the user is setting in front of but not lying on the desk based on the image, analyzing unit 22 would further ascertain that the user is reading; and if analyzing unit 22 determines that the user is lying on the desk based on the image, analyzing unit 22 would further ascertain that the user is resting.

In one embodiment, analyzing unit 22 can directly determine the real action that the targeted object is doing and then ascertain the behavioral state of the targeted object according to the real action. For example, if a user is moving in the indoor space based on the image, analyzing unit 22 can directly determine that the user is moving and further ascertain that the user is under the moving state or even under the walking or running states when further considering the moving speed of the user.

In step S43, the objective brightness corresponding to the behavioral state can be obtained by inquiring the data base via the requirements of analyzed unit 22 and/or controlling units 231, 232 and 233. Form steps S41-S43, it is known that the behavioral state of the targeted object is obtained from the image caught by photographic device, and the objective brightness is acquired by the behavioral state. Since the objective brightness is corresponding to the behavioral state of the targeted object, the objective brightness is predetermined as a proper brightness for the monitored space when the targeted object therein is under such the behavioral state and pre-stored in the data base. Accordingly, steps S41-S43 can be seen as a method for determining the brightness of the monitored space required for the targeted object therein.

In step S44, the brightness information of the monitored space is acquired based on the image of the monitored space caught by the photographic device, wherein the brightness information can be calculated and obtained by the method of YCbCr color space.

In step S45, controlling units 231, 232 or 233 receive the brightness information of the monitored space and the behavioral state of the targeted object analyzed and determined by analyzing unit, and compares the brightness information with the objective brightness corresponding to the behavioral state for determining whether the brightness of the monitored space needs to be adjusted via adjusting illuminant devices 241, 242 or 243 or shading device 25.

In steps S46 and S47, if the objective brightness is higher than the brightness information, it reveals that the brightness of the monitored space is too low and needs to be increased. Then, the illuminant device and/or the shading device can be adjusted for providing more brightness for the monitored space. On the contrary, if the objective brightness is lower than the brightness information, it reveals that the brightness of the monitored space is too high and needs to be decreased. Under this circumstance, the illuminant device and/or the shading device can be adjusted for lower the brightness in the monitored space.

In one embodiment, the brightness in the monitored space can be provided from either the illuminant device in the monitored space or the environmental light source for providing the proper brightness for some situations/spaces, e.g. the conference room at meeting, a large office having only one or few staffs therein or the greenhouse.

In step S48, the controlling unit adjusts the illuminant device and/or the shading device to make the brightness of the monitored space achieve the objective brightness corresponding to the behavioral state of the targeted object in the monitored space. Therefore, the monitored space would be illuminated under the proper brightness to avoid the unnecessary power consumption.

In the above-mentioned embodiments, since the photographic device can be the portable type, providing and acquiring the controlling authority of controlling the brightness of the monitored space for the portable photographic device may be necessary so as to avoid the interference coming from other unrecognized, irrelevant or unknown portable photographic device(s). There are many ways can used to provide and acquire the controlling authority. For example, the photographic device sends a recognized account and password to the recognizing unit to acquire the controlling authority. The photographic device acquiring the controlling authority is allowed to provide the image to the analyzed unit for the further analyses.

In one embodiment, the data can store the objective brightness corresponding to the situation that there is not any targeted object in the monitored space. That is, the present method and system is able to use for the monitored space without the targeted object therein. When the analyzed unit determines that there is not any targeted object in the monitored space via the image of the monitored space, the analyzed and/or the controlling units can look up the corresponding objective brightness to adjust the brightness of the monitored space.

In one embodiment, when the brightness of the monitored space is lower than the objective brightness corresponding to the behavioral state of the user, the brightness of the monitored space is unnecessarily be increased. Specifically, if the user, which is the targeted object in the monitored space, is under sleeping or resting states, the illuminant and/or the shading devices do not have to increase the brightness of the monitored space to the objective brightness corresponding to the sleeping or resting states even though the brightness of the monitored space is lower than the objective brightness corresponding to the sleeping or resting states. This condition can be pre-stored in the data base. On the other hand, if the user, which is the targeted object in the monitored space, is under the reading state, the illuminant and/or the shading devices do not have to decrease the brightness of the monitored space to the objective brightness corresponding to the reading state even though the brightness of the monitored space is higher than the objective brightness corresponding to the reading state. Furthermore, the conditions that, under a certain of situations, the brightness of the monitored space needs not to be decreased to the corresponding objective brightness, or has to be decreased until it is higher than the corresponding objective brightness with a specific value can also be pre-stored in the data base.

Embodiments

Embodiment 1: A method for controlling a brightness of a monitored space having a targeted object therein, comprising the steps of acquiring a brightness information of the monitored space; acquiring an objective brightness corresponding to a behavioral state of the targeted object; and determining whether the brightness of the monitored space needs to be adjusted based on the brightness information and the objective brightness.

Embodiment 2 is a method as described in Embodiment 1, wherein the targeted object is one selected from the group consisting of a user, an animal, a plant, a vehicle and a combination thereof.

Embodiment 3 is a method as described in Embodiment 1, wherein the method determines whether the brightness of the monitored space needs to be adjusted by comparing the brightness information with the objective brightness.

Embodiment 4 is a method as described in Embodiment 1 further comprising a step of adjusting the brightness of the monitored space to the objective brightness.

Embodiment 5 is a method as described in Embodiment 1, wherein the brightness information and the objective brightness are acquired via a photographic device.

Embodiment 6 is a method as described in Embodiment 5 further comprising steps of providing an illuminant device for the monitored space; and adjusting an illuminant brightness of the illuminant device to cause the brightness of the monitored space to achieve the objective brightness.

Embodiment 7 is a method as described in Embodiment 5 further comprising steps of providing a shading device for the monitored space; and adjusting a transmittance of the shading device to cause the brightness of the monitored space to achieve the objective brightness.

Embodiment 8 is a method as described in Embodiment 7, wherein the shading device is one selected from the group consisting of a glass, a curtain, a screen and a combination thereof, and the transmittance is adjusted for adjusting a shading level against an environmental light source outside of the monitored space.

Embodiment 9 is a method as described in Embodiment 5 further comprising steps of providing an illuminant device and a shading device for the monitored space; and at least one step of adjusting an illuminant brightness of the illuminant device to cause the brightness of the monitored space to achieve the objective brightness; and adjusting a transmittance of the shading device to cause the brightness of the monitored space to achieve the objective brightness.

Embodiment 10 is a method as described in Embodiment 5, wherein the photographic device is one selected from the group consisting of a cell phone, a photo camera, a video camera, a webcam, a notebook, an event data recorder, a surveillance camera and a combination thereof.

Embodiment 11 is a method as described in Embodiment 1 further comprising a step of acquiring a controlling authority for the brightness of the monitored space.

Embodiment 12: A controlling system controlling a brightness of a monitored space having a targeted object therein, comprising a photographic unit catching an image related to the monitored space; an analyzing unit analyzing a brightness information of the monitored space and a behavioral state of the targeted object based on the image; and a controlling unit adjusting the brightness of the monitored space according to the brightness information and the behavioral state.

Embodiment 13 is a controlling system as described in Embodiment 12 further comprising at least one of an illuminant device providing an illuminant brightness for the monitored space; and a shading device providing a transmittance for the monitored space.

Embodiment 14 is a controlling system as described in Embodiment 12 further comprising a recognizing unit connected to the photographic unit and determining whether the photographic unit has a controlling authority used for determining whether the image is an analyzing target to be analyzed by the analyzing unit.

Embodiment 15 is a controlling system as described in Embodiment 12 further comprising a data base connected to the controlling unit and storing a relationship of an objective brightness corresponding to the behavioral state, wherein the controlling unit adjusts the brightness of the monitored space to the objective brightness via the relationship.

Embodiment 16: A method for determining a brightness of a monitored space having a target object therein, comprising the steps of acquiring a behavioral state of the target object; and determining the brightness based on the behavioral state.

Embodiment 17 is a method as described in Embodiment 16 further comprising steps of acquiring an image of the monitored space; and acquiring a behavioral state via the image.

Embodiment 18 is a method as described in Embodiment 17 further comprising steps of ascertaining a real action of the target object from the image; and acquiring the behavioral state from the real action.

Embodiment 19 is a method as described in Embodiment 17 further comprising steps of defining a specific object near the target object from the image; acquiring a corresponding action of the target object against the specific object; and ascertaining the behavioral state from the corresponding action.

Embodiment 20 is a method as described in Embodiment 16 further comprising steps of providing a data base storing a relationship between the behavioral state and the brightness; and acquiring the brightness corresponding to the behavioral state via the relationship.

The respective devices and steps of the above-mentioned Embodiments 1-20 may be used in the different embodiments of the present disclosure, if appropriate.

While the disclosure has been described in terms of what is presently considered to be the most practical and preferred embodiments, it is to be understood that the disclosure needs not be limited to the disclosed embodiments. Therefore, it is intended to cover various modifications and similar arrangements included within the spirit and scope of the appended claims, which are to be accorded with the broadest interpretation so as to encompass all such modifications and similar structures.

What is claimed is:

1. A method for controlling a brightness of a monitored space having a targeted object therein, comprising the steps of:
   acquiring a brightness information of the monitored space;
   acquiring an objective brightness corresponding to a behavioral state of the targeted object by inquiring a stored relationship of the objective brightness from a data base, wherein the objective brightness is an expectative brightness for the monitored space while the targeted object is under the behavioral state; and
   determining whether the brightness of the monitored space needs to be adjusted based on the brightness information and the objective brightness.

2. The method as claimed in claim 1, wherein the targeted object is one selected from the group consisting of a user, an animal, a plant, a vehicle and a combination thereof.

3. The method as claimed in claim 1, wherein the method determines whether the brightness of the monitored space needs to be adjusted by comparing the brightness information with the objective brightness.

4. The method as claimed in claim 1 further comprising a step of adjusting the brightness of the monitored space to the objective brightness.

5. The method as claimed in claim 1, wherein the brightness information and the objective brightness are acquired via a photographic device.

6. The method as claimed in claim 5 further comprising steps of:
   providing an illuminant device for the monitored space; and
   adjusting an illuminant brightness of the illuminant device to cause the brightness of the monitored space to achieve the objective brightness.

7. The method as claimed in claim 5 further comprising steps of:
   providing a shading device for the monitored space; and
   adjusting a transmittance of the shading device to cause the brightness of the monitored space to achieve the objective brightness.

8. The method as claimed in claim 7, wherein the shading device is one selected from the group consisting of a glass, a curtain, a screen and a combination thereof, and the transmittance is adjusted for adjusting a shading level against an environmental light source outside of the monitored space.

9. The method as claimed in claim 5 further comprising steps of:
providing an illuminant device and a shading device for the monitored space; and at least one step of:
adjusting an illuminant brightness of the illuminant device to cause the brightness of the monitored space to achieve the objective brightness; and
adjusting a transmittance of the shading device to cause the brightness of the monitored space to achieve the objective brightness.

10. The method as claimed in claim 5, wherein the photographic device is one selected from the group consisting of a cell phone, a photo camera, a video camera, a webcam, a notebook, an event data recorder, a surveillance camera and a combination thereof.

11. The method as claimed in claim 1 further comprising a step of acquiring a controlling authority for the brightness of the monitored space.

12. A controlling system controlling a brightness of a monitored space having a targeted object therein, comprising:
a photographic unit catching an image related to the monitored space;
an analyzing unit analyzing a brightness information of the monitored space and a behavioral state of the targeted object based on the image; and
a controlling unit adjusting the brightness of the monitored space according to the brightness information and an objective brightness corresponding to the behavioral state, wherein the objective brightness is acquired by inquiring a stored relationship of the objective brightness corresponding to the behavioral state from a data base and the objective brightness is an expectative brightness for the monitored space while the targeted object is under the behavioral state.

13. A controlling system as claimed in claim 12 further comprising at least one of:
an illuminant device providing an illuminant brightness for the monitored space; and a shading device providing a transmittance for the monitored space.

14. A controlling system as claimed in claim 12 further comprising a recognizing unit connected to the photographic unit and determining whether the photographic unit has a controlling authority used for determining whether the image is an analyzing target to be analyzed by the analyzing unit.

15. A controlling system as claimed in claim 12, wherein the data base is connected to the controlling unit and the controlling unit adjusts the brightness of the monitored space to the objective brightness via the relationship.

16. A method for determining a brightness of a monitored space having a target object therein, comprising the steps of:
acquiring a behavioral state of the target object; and
determining the brightness based on an objective brightness corresponding to the behavioral state, wherein the objective brightness is acquired by inquiring a stored relationship of the objective brightness corresponding to the behavioral state from a data base, and the objective brightness is an expectative brightness for the monitored space while the targeted object is under the behavioral state.

17. The method as claimed in claim 16 further comprising steps of:
acquiring an image of the monitored space; and
acquiring a behavioral state via the image.

18. The method as claimed in claim 17 further comprising steps of:
ascertaining a real action of the target object from the image; and
acquiring the behavioral state from the real action.

19. The method as claimed in claim 17 further comprising steps of:
defining a specific object near the target object from the image;
acquiring a corresponding action of the target object against the specific object; and ascertaining the behavioral state from the corresponding action.

* * * * *